(12) United States Patent
Pilgrim

(10) Patent No.: US 7,996,479 B2
(45) Date of Patent: Aug. 9, 2011

(54) EMPLOYEE COMMUNICATION REPUTATION

(75) Inventor: Alfred Pilgrim, Berkshire (GB)

(73) Assignee: Clearswift Limited, Berkshire (GB)

( * ) Notice: Subject to any disclaimer, the term of this patent is extended or adjusted under 35 U.S.C. 154(b) by 61 days.

(21) Appl. No.: 12/640,438

(22) Filed: Dec. 17, 2009

(65) Prior Publication Data
US 2010/0161746 A1 Jun. 24, 2010

(30) Foreign Application Priority Data
Dec. 18, 2008 (GB) .................. 0823143.3

(51) Int. Cl.
G06F 15/16 (2006.01)
(52) U.S. Cl. ....................... 709/206; 709/224
(58) Field of Classification Search .......... 709/200–206, 709/217–227
See application file for complete search history.

(56) References Cited

U.S. PATENT DOCUMENTS

| | | | |
|---|---|---|---|
| 2002/0111811 A1* | 8/2002 | Bares et al. | 704/275 |
| 2004/0010720 A1* | 1/2004 | Singh et al. | 713/201 |
| 2006/0242040 A1* | 10/2006 | Rader | 705/35 |
| 2007/0244974 A1* | 10/2007 | Chasin | 709/206 |
| 2009/0012946 A1* | 1/2009 | Tsunokawa | 707/3 |

FOREIGN PATENT DOCUMENTS

| | | |
|---|---|---|
| GB | 2401002 | 10/2004 |
| WO | WO02/06997 | 1/2002 |
| WO | WO2006/088915 | 8/2006 |

OTHER PUBLICATIONS

European Search Report dated May 4, 2010.

* cited by examiner

Primary Examiner — Moustafa M Meky
(74) Attorney, Agent, or Firm — Alston & Bird LLP

(57) ABSTRACT

A method of controlling a system of monitoring messages in a network is described. A message sent by a user of the network to one or more recipients is received and a weight is applied to any text from any previous message that appears in the message. A measure of language content used in the message is formed and stored in one or more data stores. Information identifying the sender of the message is also stored. The stored measure of the language content and the stored information identifying the sender is reported to an administrator of the system.

23 Claims, 4 Drawing Sheets

EMPLOYEE COMMUNICATION REPUTATION

The present invention relates to a system and method of controlling a system of monitoring messages in a network and relates in particular, but not exclusively, to a system and a method for tracking the tone and style of employees' electronic communications.

This application claims priority from British Patent Application No. 0823143.3 filed on Dec. 18, 2008.

Modern electronic communication systems such as email or instant messaging are used extensively within organisations and businesses, and are in many cases replacing face-to-face meetings. There are many reasons why an organisation might want to monitor these electronic communications for the tone and style of language employed whilst using company equipment. They may want to monitor the way in which help desk agents interact with customers, or to monitor the way in which employees treat each other. This data can then be used to highlight communication risk areas leading perhaps to training opportunities and the same system can then be used later to determine the effectiveness of such training. It can also be used when helping to resolve employee disputes.

The idea of "sender reputation" has been used before as a way of identifying whether one is willing to receive an item of electronic communication from a sender. The broad outline is described in "Sender Reputation in a Large Webmail Service", by Bradley Taylor, presented at CEAS 2006—Third Conference on Email and Anti-Spam, Jul. 27-28, 2006, Mountain View, Calif.

U.S. Pat. No. 7,206,814 describes how an email gateway can update and query a central database that contains the reputation of the sending email address, domain name or IP address. The reputation value returned from the central database is used as the basis for whether the email is accepted, perhaps in association with other tests.

The concept of obtaining a reputation associated with a network user or location is used, for example, on auction sites such as eBay™. These sites allow users to rate a seller or buyer's reputation. The reputation is then displayed for other users to see.

It will be clear that in this invention we use the term "reputation" to mean a much wider range of meaning than simply whether we should accept email from someone. The concept of "sentiment analysis" is a well understood branch of natural language understanding. WO/20061113761 describes how such an engine could be used to simply determine whether comments about financial entities are positive or negative. In a similar fashion Autonomy's Qfiniti Explore product can detect unhappy or frustrated customers through text messages and enable the issue to be mitigated as quickly as possible.

Infonic's Sentiment software is used to determine whether the sentiment inside a news article is positive, negative or neutral against a supplied company name.

Again it will be clear in this invention we use the term "sentiment" to mean a wider set of nuances of tone as opposed to simple positive or negative values generated from matching a word or phrase to a document.

Automated tools to help assess risk have also been developed. US patent application 20060116898 describes such a system, complete with a graphical display of where the risks lie.

However none of these solutions allow all messages sent from within an organisation to be monitored for a wide range of style and content and then compare that style and content with those used by others. Instead of a simple "happy" or "unhappy" analysis the present invention allows many different styles of language and the tone used therein to be monitored, thus allowing employees whose style is consistently different from the norm to be easily identified. The norm may be derived from the styles of other employees in the same department or the same company.

SUMMARY OF INVENTION

According to a first aspect of the invention, there is provided a method of controlling a system of monitoring messages in a network, the method comprising: receiving a message sent by a user of the network to one or more recipients; applying a weight to any text from any previous message that appears in the message; forming a measure of language content used in the message; storing the measure of the language content used in the message, and information identifying the sender of the message in one or more data stores; reporting the stored measure of the language content, and the stored information identifying the sender to an administrator of the system.

According to a second aspect of the invention, there is provided a server computer device, comprising a computer program product containing code for causing the server computer device to perform the method.

According to a third aspect of the invention, there is provided a computer program product, for use on a client computer device connected to a computer network, the computer program product containing code for causing said device to perform the method.

The invention can be used to determine if a particular end user is subject to, for example, workplace bullying by identifying whether messages sent to just one destination have different sentiments than those sent to other employees.

The measure of the language content used in the messages to one recipient may be compared against the measure of the language content used in messages to other recipients. In this way, an administrator can determine the perception from other employees as to how well someone else performs their job by monitoring whether one recipient receives many more messages with a particular style or tone than other users. For example, if all or the majority of messages to a particular recipient are determined to have a "frustrated" tone of language when compared against the tone of language used in messages to other recipients, this may indicate that the particular recipient does not have suitable customer service skills. For example, it may be the case that the messages received by the particular recipient are from customers who are using a "frustrated" tone of language because they are unhappy with the service that the particular employee is providing.

BRIEF DESCRIPTION OF THE DRAWINGS

For a better understanding of the invention, and to show more clearly how it may be carried into effect, reference will now be made, by way of example only, to the accompanying drawings in which.

DETAILED DESCRIPTION OF PREFERRED EMBODIMENTS

Figure 1:
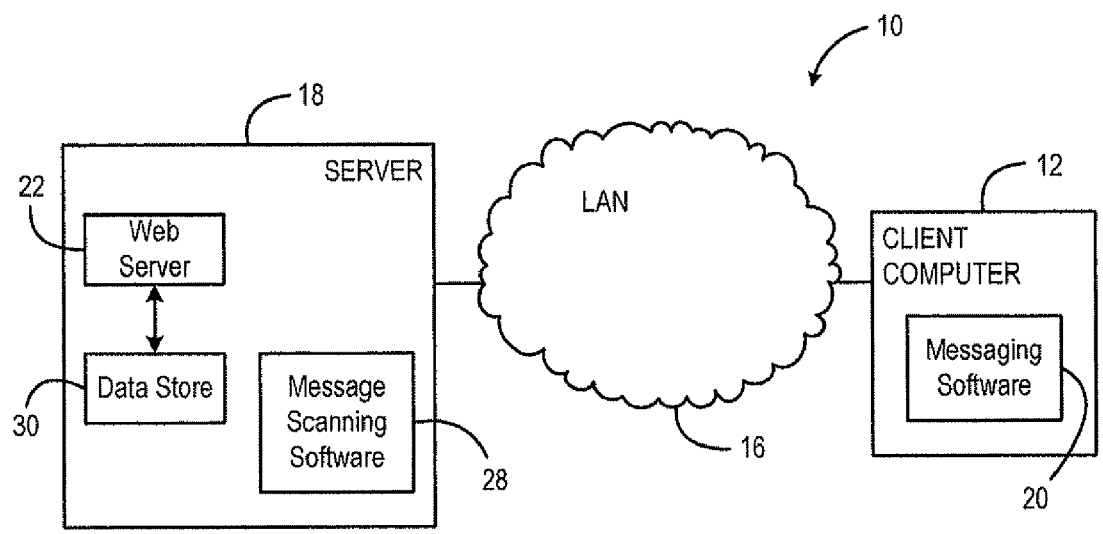
FIG. 1 is a block schematic diagram, showing a computer system in accordance with an aspect of the present invention.

FIG. 1 is a schematic diagram, showing a computer system 10. The system 10 includes a client computer 12 connected over a local area network (LAN) 16, which also includes a server computer 18. It will be appreciated that the network 16 may well have more than one client computer or more than one server computer connected to it. However, the invention can be sufficiently described with reference to a network containing one client computer and one server computer.

The client computer 12 can run messaging application software 20 used to send messages through the message gateway server 18. The server 18 runs message scanning software 28, and has access to a data store 30. The server 18 also runs a web server 22 that also has access to the data store 30. The data store 30 and web server 22 are shown as part of the server 18, but can instead be provided on a separate device accessible from the server 18. The functionality of the server 18, as described below, can be provided on a network server machine, or on a separate machine only dealing with this functionality. One or more such server can be used to provide the required functionality.

In a corporate or other network environment, the system administrator can take steps to ensure that a client computer must use the gateway server in order to send messages.

The invention is described herein with reference to an example in which the application software 20 running on the client computer 12 comprises a client email program such as Microsoft Outlook™. However, the invention is applicable to all operations in which messages can be transferred from one user to another including instant messaging, web postings (for example, on social networking sites, wikis, etc) and attachments held within emails.

Figure 2:
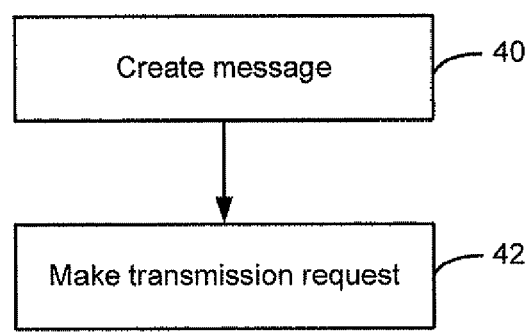
FIG. 2 is a flow chart, showing steps performed in a client device, and in a server, of the computer system of FIG. 1, at a first stage in a process in accordance with an aspect of the present invention.

FIG. 2 is a flow chart, illustrating a first phase of the operation of the system 10. With reference to FIG. 2, a message is created by the originating user (step 40), and a message transmission request is made in the application software 20 on the client computer 12 (step 42).

Figure 3:
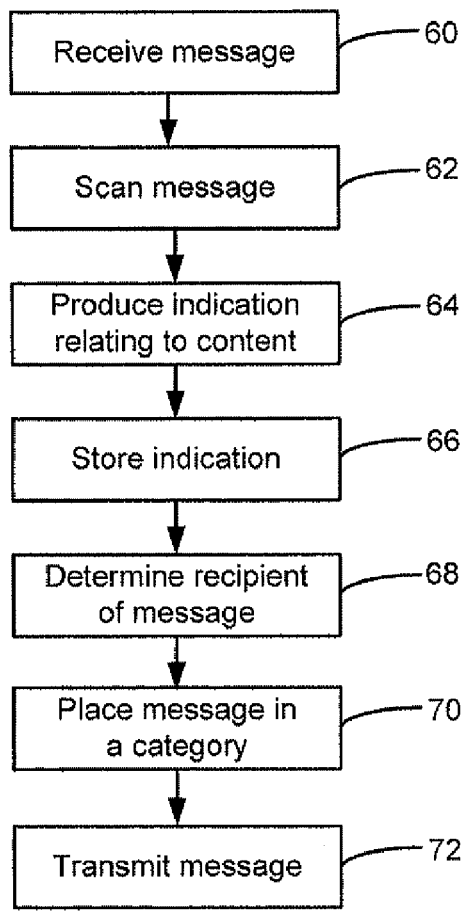
FIG. 3 is a flow chart, showing steps performed in a client device, and in a server, of the computer system of FIG. 1, at a second stage in a process in accordance with an aspect of the present invention.

FIG. 3 is a flow chart, illustrating a second phase of the operation of the system 10, once the message has been received at the message server 18.

In step 60 of the process, the message is received at the server 18 using available message transports such as SMTP for email. The message is scanned by the message scanning software (step 62) and an indication relating to the content of the message is produced (step 64). The indication can be based on lexical analysis of the message, or by grammatical analysis or other techniques as may become available. The indication could be expressed as a single value or as a set of values representing the various aspects of the language used in the message.

In terms of lexical analysis, the indication might be a set of numbers where each number represents the number of times a certain word appeared, or a single number that was the sum of all the times that certain words or phrases appeared. Multiple sets of words or phrases could be defined, some having a positive attribute and others having negative attributes. For example, there might be defined a list of impolite terms and a list of polite terms. The indication of "politeness" might be the number of times polite words appeared with the number of times impolite words appeared subtracted. An alternative approach might be to weight the individual words or phrases to indicate their politeness, with slightly polite words or phrases weighted with a small positive number and offensively impolite words or phrases being weighted with a large negative number. The degree of politeness would be the sum of the weights for each occurrence of the word in the message.

Multiple types of sentiment could be combined within the indication. The indication could include, for example, whether the language used was polite or impolite, threatening or apologetic, formal or casual. The result would be an indication that could be represented as having positive or negative scores for a potentially wide range of human emotions and language used within the messages.

Grammatical analysis could also be used, either alone or in conjunction with lexical analysis. Again positive or negative aspects could be represented within the indication, supporting for example written styles such as brusque or longwinded, well constructed or poorly constructed, well spelt or full of spelling errors.

In step 66, the scanning software stores the indication in the data store 30, along with other useful information. This would normally include the intended recipient(s) of the message and the date and time of the scan, but it could also include any other information contained in the message such as the message itself. The data stored might depend on the value of the indication. The other useful information may also include the category to which the message belongs, the category being based on the recipient of the message.

The message is analysed to determine the recipient of the message (step 68) and the message is placed in a category based on the determined recipient (step 70). The recipient may be a known recipient (for example, when the user is sending an e-mail to or is instant messaging a person the user knows), a group of known recipients (for example, when the user is sending an e-mail to or is instant messaging a group of people the user knows) or a group of unknown recipients (for example, when the user is posting a message on a bulletin board or in a forum). The category is associated with the sender of the message and is stored in one or more data stores.

The measure of the language content used in messages from one user placed in one category is compared against the measure of the language content used in messages from the same user placed in other categories. For example, the measure of the language content used in messages from a user in a category where the recipient is a known recipient is compared against the measure of the language content used in messages from the same user in a category where the recipient is a group of known recipients and/or where the recipient is a group of unknown recipients.

Alternatively, the measure of the language content used in messages from one user placed in one category is compared against the measure of the language content used in messages from other users placed in the same category. The form of the comparison depends on the form of the measure of the language content. For example, the measure of the language content used in messages from other users may be the average measure of the language content used in messages from the other users. Alternatively, the comparison may be based on Bayesian analysis or some such.

In step 72, the scanning software normally delivers the message to its intended destination, but standard rules might be applied to halt onward transmission depending on the values of the indication computed in step 64.

It will be appreciated that step 62 may include scanning component parts of the message, such as attachments to the message. The scanning process must also be intelligent, for example applying a weight to any quoted text in a message—often indicated by lines preceded by '>' or '|'—as these lines were not entered by the sender of the message and do not reflect the written style of the sender. For example, the weight applied to any quoted text may be set to zero such that any text from any previous message that appears in the message is disregarded.

There is therefore described a system which can maintain a history of the tone of language and written style used in messages sent by all users on the network.

Figure 4:
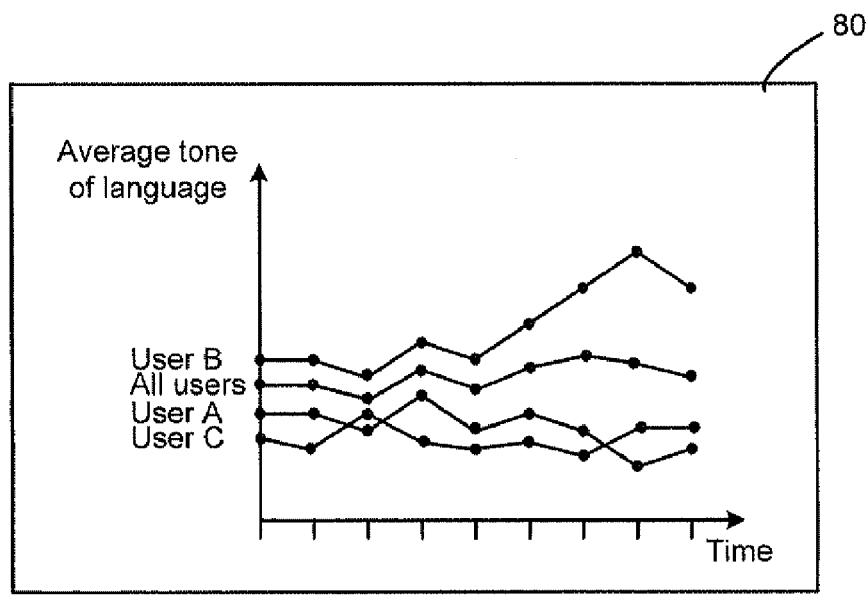
FIG. 4 illustrates an example user interface displaying data represented in a graph to a user in operation of the system in accordance with the invention.

FIG. 4 illustrates an example user interface 80, by means of which a manager or other authorised employee can check the history of the tone of language sent by one or more users on the local area network.

In FIG. 4, the user interface 80 displays a graph that indicates the tone of language used by a specific user over a period of time. It shows the average value for various indications plotted by time, and also the average value for all users. Thus is it possible to identity users who consistently use less polite language than other users. For example, as shown in FIG. 4, the average tone of language used by User B is consistently above the average tone of language used by all users, which may indicate that User B is consistently using less polite language than the other users.

The graph is displayed in a web browser running on any client computer connected to the web server 22 that collects data from the data store 30.

Figure 5:
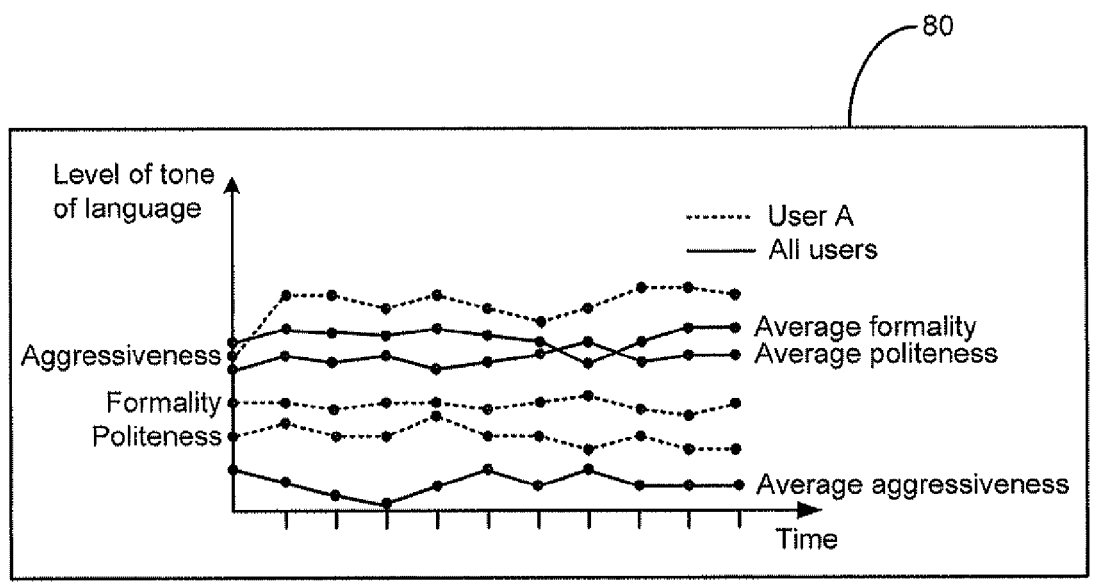
FIG. 5 illustrates the example user interface displaying another graph to a user in operation of the system in accordance with the invention.

FIG. 5 illustrates another graph that could be displayed by the user interface 80. The graph shows various levels of the tone of the language monitored over time. The levels of tone of language being monitored are politeness, aggressiveness and formality. The levels used by a particular user are mapped against the average for all other users during a certain period of time, for example, for a month.

Other types of output can be supplied such as the users who are in the upper quartile for aggressiveness and so on.

In a further extension to the system it could be possible to display the tone of language used for particular recipients compared with other recipients from a single user. This would be useful in the case of analysing employee disputes such as those of harassment.

There is therefore described a system which monitors the tone of language used by each user in messages, and allows a manager or other authorised person to view the tone of language used by all users and to whom and compare this with the norm.

Figure 6:
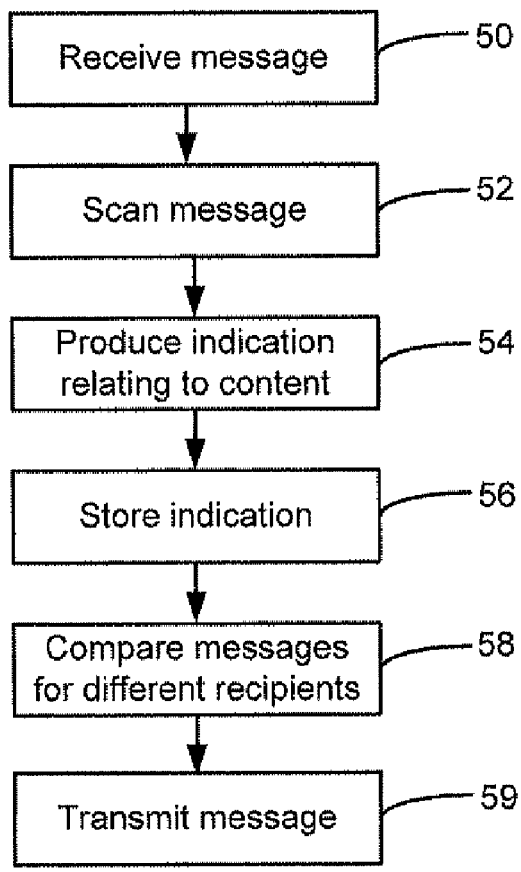
FIG. 6 is a flow chart, showing steps performed in a client device, and in a server, of the computer system of FIG. 1, in an alternative second stage in the process in accordance with an aspect of the present invention.

FIG. 6 is a flow chart, illustrating an alternative to the second phase of the operation of the system 10, once the message has been received at the message server 18.

With reference to FIG. 6, a message is received at the server 18 (step 50). The received message is scanned (step 52) and an indication relating to the measure of language content used in the message is produced (step 54). The indication is stored (step 56) together with information identifying the recipient of the message.

The measure of the language content used in messages intended for one recipient is compared against the measure of the language content used in messages intended for other recipients (step 58). If, for example, all or the majority of messages intended for the one recipient have a "frustrated" tone of language when compared against the tone of language used in messages intended for other recipients, this may indicate that the particular recipient does not have satisfactory customer service skills. For example, it may be the case that the messages received by the particular recipient are from customers who are using a "frustrated" tone of language because they are unhappy with the service that the particular employee is providing.

Also, if, for example, all or the majority of messages intended for a certain employee from one or more other employees have an "aggressive" tone of language when compared against the norm, this may indicate workplace bullying.

The measure of the language content used in messages may be compared against a set measure. When this set measure is exceeded, an alert may be generated and sent to an administrator of the system.

In step 59, the message is transmitted to the intended recipient. However, if the administrator of the system considers that workplace bullying is occurring, the administrator may prevent the message being sent to the intended recipient. For example, this may be the case if the administrator receives an alert indicating that the set measure of the language content has been exceeded.

Figure 7:
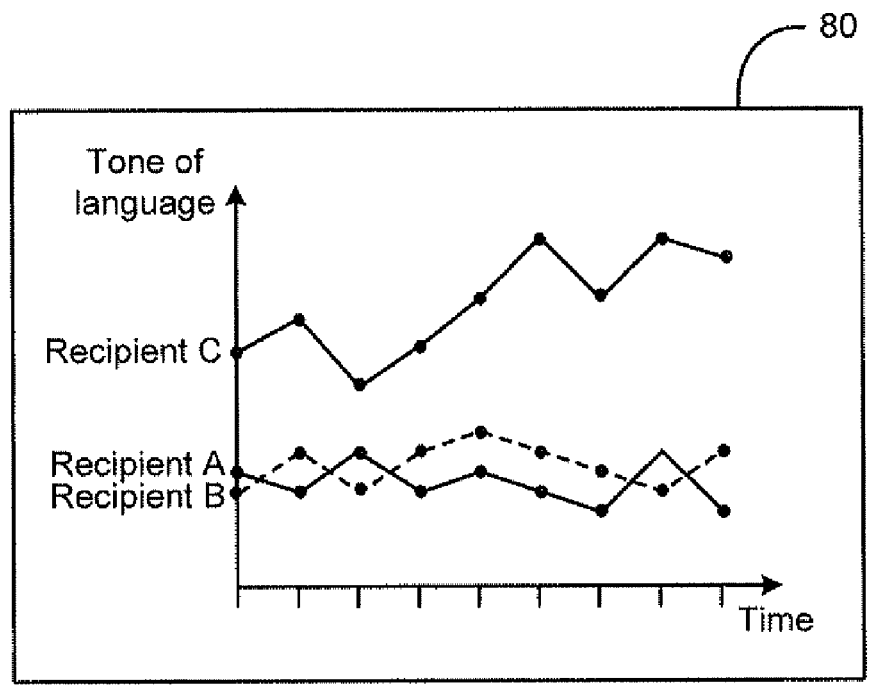
FIG. 7 illustrates the example user interface displaying another graph to a user in operation of the system in accordance with the invention.

FIG. 7 illustrates a graph that is displayed by the user interface 80. The graph indicates the tone of the language used in messages received by different recipients over a period of time. From the graph, an administrator of the system can identify any recipient that is receiving messages with a tone of language that differs from the tone of language used in messages received by other recipients. This may indicate to the administrator whether workplace bullying is occurring or whether or not the employee is performing their job to the required standard. For example, if the tone of the language used in messages to a certain employee from other employees is consistently greater by some measure than the norm, this may indicate that the messages to this certain employee are "aggressive" and thus indicate workplace bullying. Alternatively, if the tone of language used in messages to a certain recipient is consistently greater by some measure than the tone of language used in messages to other recipients, this may indicate that customers sending the messages to this certain recipient are "frustrated" or "unhappy" with the service being received from them.

The invention claimed is:

1. A method of controlling a system of monitoring messages in a network, the method comprising:
   a) receiving a message sent by a user of the network to one or more recipients;
   b) applying a weight to any text from any previous message that appears in the message;
   c) forming a measure of language content used in the message;
   d) storing the measure of the language content used in the message, and information identifying the sender of the message in one or more data stores;
   e) reporting the stored measure of the language content, and the stored information identifying the sender to an administrator of the system.

2. A method as claimed in claim 1, further comprising storing a timestamp for each message.

3. A method as claimed in claim 1, further comprising storing information identifying the recipient(s) of each message.

4. A method as claimed in claim 3, further comprising comparing the measure of the language content used in the messages from at least one user to one specific recipient against the measure of the language content used in the messages from other users.

5. A method as claimed in claim 3, further comprising comparing the measure of the language content used in the messages from at least one user to one specific recipient against the measure of the language content used in other messages from said at least one user.

6. A method as claimed in claim 3, further comprising comparing the measure of the language content used in the messages to one recipient against the measure of the language content used in messages to other recipients.

7. A method as claimed in claim 6, wherein the network is a local area network.

8. A method as claimed in claim 1, further comprising storing the message.

9. A method as claimed in claim 8, wherein the step of storing the message is performed only if the measure of the language content used in the message exceeds a predefined threshold.

10. A method as claimed in claim 1, wherein the weight is zero such that any text from any previous message that appears in the message is disregarded.

11. A method as claimed in claim 1, wherein the step of forming a measure of the language content used in the message includes forming a measure of the language content used in any attachments to the message.

12. A method as claimed in claim 1, wherein the measure of language content used in the message is a measure of the tone of the language used in the message.

13. A method as claimed in claim 12 wherein the step of forming a measure of the tone of language used in the message comprises:
  for each of a plurality of pairs of tonal opposites, determining a measure as to a position of the tone of language used in the message on a scale including said pair.

14. A method as claimed in claim 12 wherein the step of forming a measure of the tone of language used in the message comprises:
  counting a number of occurrences of each of a plurality of tonal indication words.

15. A method as claimed in claim 1, further comprising the steps of:
  analysing the message to determine the recipient of the message;
  placing the message in a category based on the determined recipient;
  storing the category in one or more data stores; and
  wherein the category is associated with the sender of the message.

16. A method as claimed in claim 15, wherein the recipient is a known recipient.

17. A method as claimed in claim 15, wherein the recipient is a group of known recipients.

18. A method as claimed in claim 15, wherein the recipient is a group of unknown recipients.

19. A method as claimed in claim 15, further comprising comparing the measure of the language content used in messages from one user placed in one category against the measure of the language content used in messages from the same user placed in other categories.

20. A method as claimed in claim 15, further comparing the measure of the language content used in messages from one user placed in one category against the measure of the language content used in messages from other users placed in the same category.

21. A method as claimed in claim 15, further comprising comparing the measure of the language content used in the messages from at least one user against the measure of the language content used in the messages from other users.

22. A server computer device, comprising a computer program product containing code for causing the server computer device to perform the following steps:
  a) receiving a message sent by a user of the network to one or more recipients;
  b) applying a weight to any text from any previous message that appears in the message;
  c) forming a measure of language content used in the message;
  d) storing the measure of the language content used in the message, and information identifying the sender of the message in one or more data stores;
  e) reporting the stored measure of the language content, and the stored information identifying the sender to an administrator of the system.

23. A computer program product, for use on a client computer device connected to a computer network, the computer program product containing code for causing said device to perform the following steps:
  a) receiving a message sent by a user of the network to one or more recipients;
  b) applying a weight to any text from any previous message that appears in the message;
  c) forming a measure of language content used in the message;
  d) storing the measure of the language content used in the message, and information identifying the sender of the message in one or more data stores;
  e) reporting the stored measure of the language content, and the stored information identifying the sender to an administrator of the system.

* * * * *